July 20, 1937.  J. F. SHENEMAN  2,087,819
AUTOMOBILE BRAKE
Filed Oct. 17, 1936    3 Sheets-Sheet 2

Inventor
J. F. Sheneman
By Clarence A. O'Brien
Hyman Berman
Attorneys

July 20, 1937.
J. F. SHENEMAN
2,087,819
AUTOMOBILE BRAKE
Filed Oct. 17, 1936
3 Sheets-Sheet 3
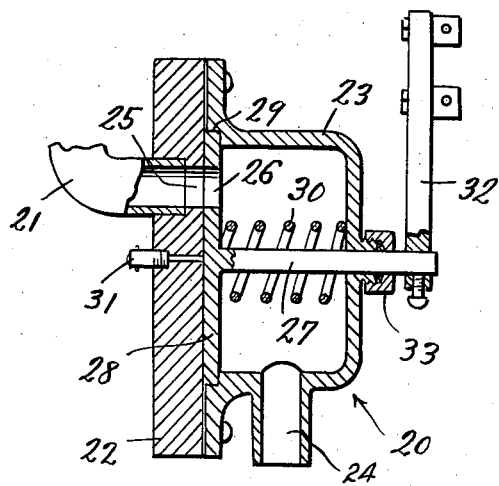
Fig. 5.
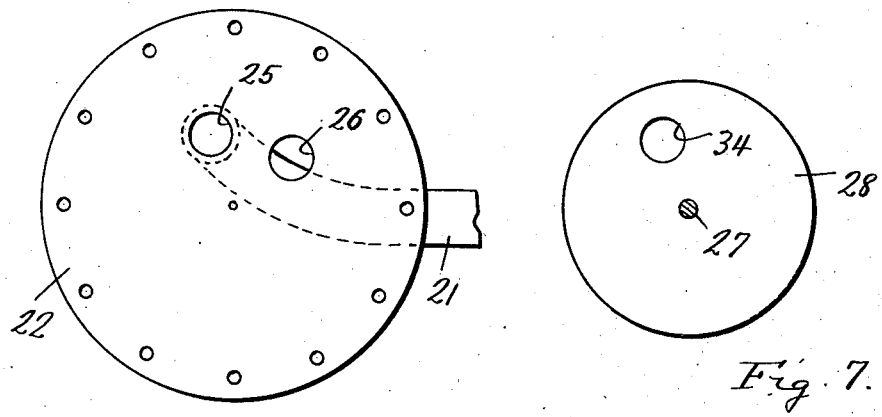
Fig. 6.
Fig. 7.
Inventor
J. F. Sheneman
By Clarence A. O'Brien
Hyman Berman
Attorneys Patented July 20, 1937

2,087,819

UNITED STATES PATENT OFFICE 2,087,819

AUTOMOBILE BRAKE

Joseph Forrest Sheneman, Somerset, Ky.

Application October 17, 1936, Serial No. 106,231

2 Claims. (Cl. 192—3)

The present invention relates to new and useful improvements in brakes for automobiles and has for its primary object to provide, in a manner as hereinafter set forth, a novel mechanism, operable by vacuum or suction created by the engine, for automatically applying the brakes of the vehicle when the accelerator is released.

Another very important object of the invention is to provide an automatic brake operating means of the aforementioned character embodying a construction and arrangement which is such that it will interfere no way with the manual application of the brakes in the usual manner.

Still another important object of the invention is to provide an automatic brake operating means of the character described for automobiles which may readily be rendered inoperative when desired.

Other objects of the invention are to provide an automatic brake operating means for automobiles which will be comparatively simple in construction, strong, durable, highly efficient and reliable in use, compact, light in weight and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 5 is a detail view principally in horizontal section through the control valve.

Figure 6 is a detail view in side elevation of the control valve base, looking at the inner side thereof.

Figure 7 is a detail view of the rotary plate or disk constituting a part of the control valve.

Figure 8 is a detail view in elevation of the fluid pressure motor with one of the disks removed and looking at the interior thereof.

Figure 1:
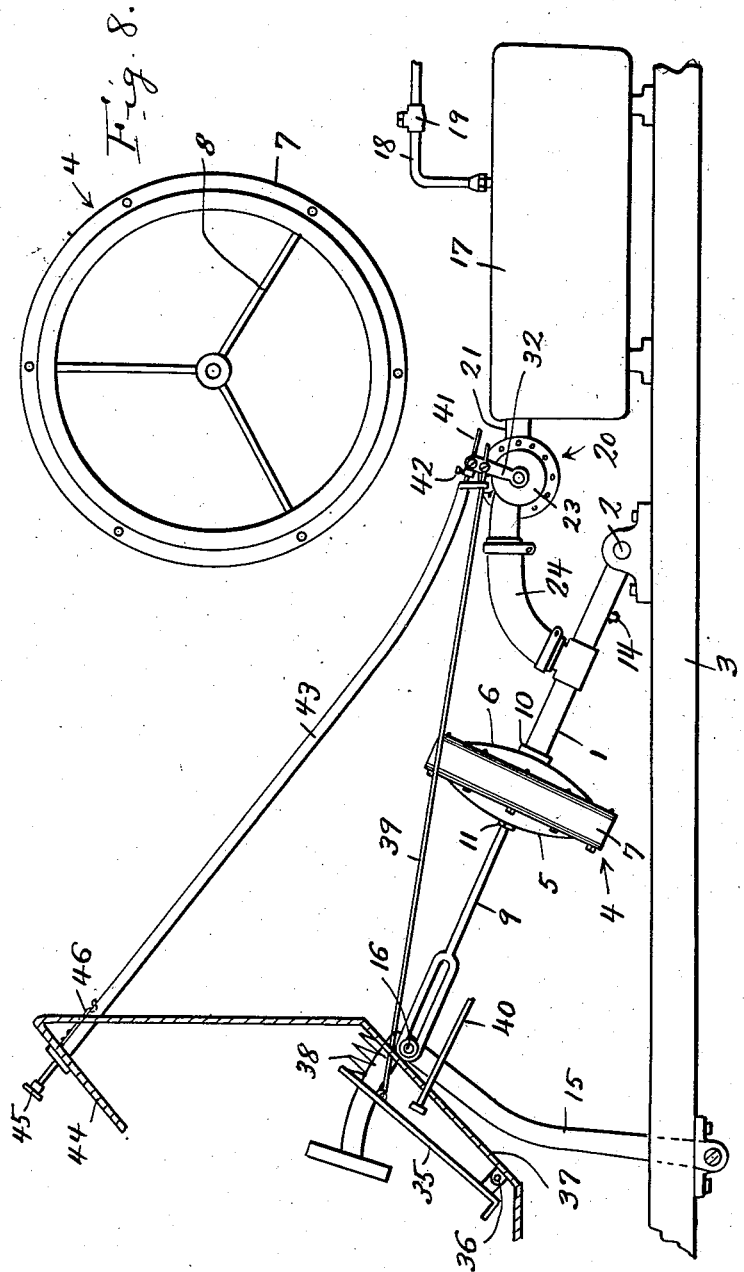
Figure 1 is a view in side elevation of the invention.
Figure 2:
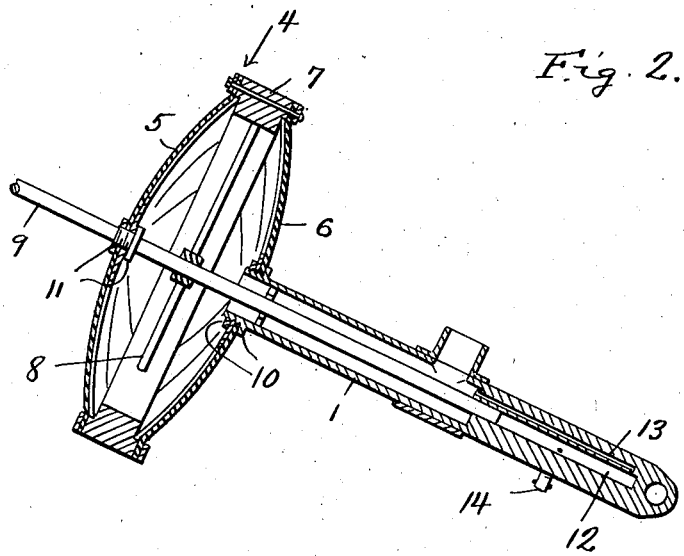
Figure 2 is a view in vertical longitudinal section through the fluid pressure motor and its support.
Figures 3, 4:
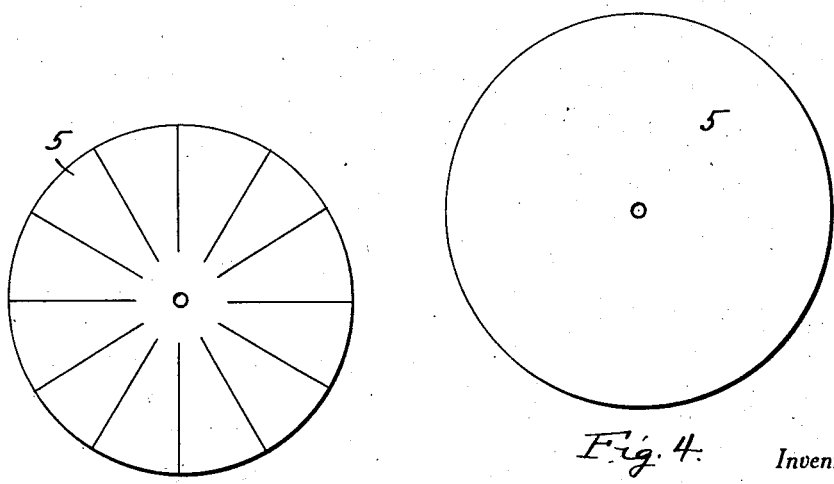
Figure 3 is a detail view in elevation, looking at the inner side of one of the fluid pressure motor disks.
Figure 4 is a detail view in elevation, looking at the outer side of one of the fluid pressure motor disks.

Referring now to the drawings in detail, it will be seen that the embodiment of the invention which has been illustrated comprises a substantially tubular post 1 which is pivotally mounted, as at 2, for swinging movement in a vertical plane on a suitable support, such as the frame 3 of the vehicle. As shown to advantage in Figure 2 of the drawings, the post 1 is closed at its pivoted end and open at its free end.

Mounted on the free end of the tubular post 1 is a fluid pressure motor which is designated generally by the reference numeral 4. The fluid pressure motor 4 comprises flexible disks 5 and 6 having their outer marginal portions secured to opposite sides of a ring 7 in a manner to prevent leakage. The ring 7 is supported on a spider 8 which is slidably mounted on a rod 9. The rod 9, it will be observed, passes through the fluid pressure motor 4 into the tubular post 1. The disk 6 is secured on the free end portion of the post 1 as at 10 and the disk 5 is secured on the rod 9, as at 11. The forward end portion of the rod 9 is slidably engaged in a guide socket 12 which is provided therefor in the lower end portion of the post 1, said guide socket 12 being provided with a vent 13. A suitable fitting 14 is provided for lubricating the rod 9 in the socket 12. At its rear end, the rod 9 is coupled to the usual brake pedal 15 of the vehicle by a pin and slot connection 16.

Reference numeral 17 designates a vacuum tank which is connected by a pipe 18 to the intake manifold of the automobile engine. A check valve 19 is provided in the pipe 18, said check valve opening toward the engine. Reference numeral 20 designates generally a control valve which is mounted on the vacuum tank 17 for communication therewith through the medium of an elbow 21.

As illustrated to advantage in Figure 5 of the drawings, the valve 20 includes a base 22 mounted on the elbow 21. Mounted on the base 22 is a casing 23 which is connected by conduit means 24, including a flexible section, to the tubular post 1. The base 22 is provided with a vacuum port 25 communicating with the elbow 21 and a vent 26. Extending rotatably into the casing 23 is a stem 27 having fixed on its inner end a disk 28 which is rotatably engaged with the base 22. The casing 23 is recessed, as at 29, for rotatably accommodating the peripheral portion of the disk 28. A coil spring 30 in the casing 23 yieldingly urges the disk 28 against the base 22. A suitable fitting 31 is provided for lubricating the valve disk 28. Fixed on the outer end portion of the stem 27 is an arm 32. A packing 33 is provided for preventing leakage around the stem 27 where it passes through the casing 23. The valve disk 28 is provided with a port 34 for registry with the port 25 or the vent 26.

An accelerator pedal 35 is hingedly mounted at one end, as at 36, on the toe board 37 of the automobile. A coil spring 38 yieldingly supports the free end of the accelerator pedal 35. A rod 39 has one end connected to the accelerator pedal 35 and its other end secured to the arm 32. The reference numeral 40 designates the accelerator rod to the throttle valve of the engine, said rod being actuated by the foot pedal 35.

The reference numeral 41 designates a flexible rod having one end portion slidably connected to the arm 32 of the valve 20. A collar 42 is adjustably secured on the rod 41 for abutting engagement with the arm 32. The flexible rod 41 extends slidably through a housing 43 to the instrument board 44 of the automobile where it is provided with an operating knob or button 45. A resilient latch 46 is provided for releasably securing the rod 41 in set position. It will be noted that the spring 38 normally maintains the accelerator pedal 35 in spaced relation to the rod 40.

Briefly, the operation of the device is substantially as follows:

When the pedal 35 is depressed against the tension of the coil spring 38 for accelerating the engine through the rod 40, the valve 20 is actuated through the rod 39 in a manner to move the port 34 out of registry with the port 25, thereby cutting off the fluid pressure motor 4 from communication with the vacuum tank 17. When the pedal 35 is released for decelerating the engine, said pedal is raised to inoperative position by the coil spring 38 and the valve 20 is moved to establish communication between the fluid pressure motor 4 and the vacuum tank 17, thus collapsing said fluid pressure motor and depressing the brake pedal 15 through the medium of the rod 9 for applying the brakes of the vehicle. It may be well to here state that when the foot pedal 35 is depressed for accelerating the engine the port 34 is brought into registry with the port 26 for venting the fluid pressure motor 4. By spacing the pedal 35, when in its fully raised or retracted position, from the rod 40 it will be observed that initial independent downward movement of said pedal 35 may be had. When the pedal 35 is depressed into engagement with the adjacent end of the rod 40 the suction or vacuum is broken, thereby releasing the brakes. When in this position the compression of the engine may be utilized in the usual manner for decelerating the vehicle. For a slight application of the brakes by suction or vacuum, the pedal 35, after being released, is returned to a position between its fully raised position and the rod 40. To render the apparatus inoperative it is only necessary to push the rod 41 forwardly with the stop collar 42 thereon, thereby preventing the spring 38 from raising the pedal 35 out of engagement with the accelerator rod 40. By reason of the pin and slot connection 16 the brake pedal 15 of the vehicle may be manually operated in the usual manner.

It is believed that the many advantages of an automatic automobile brake operating means constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:—

1. In a brake mechanism comprising a foot pedal for applying the brakes, a vacuum tank, a substantially tubular post, said post being closed at one end and open at its other end, a fluid pressure motor mounted on the open end of the post and communicating therewith, a rod extending through the fluid pressure motor and secured thereto for actuation thereby, one end portion of said rod being slidably engaged in the post, means connecting the other end of the rod to the foot pedal, and valve controlled conduit means connecting the tubular post to the vacuum tank.

2. In a motor vehicle comprising a brake operating pedal, a substantially tubular, pivotally mounted post, said post being closed at its pivoted end and open at its free end, a fluid pressure motor mounted on the free end of the post and communicating therewith, said post having a guide socket in its closed end portion, a rod operatively connected to the brake pedal and extending through the fluid pressure motor and secured thereto for actuation thereby, one end portion of said rod being slidably engaged in the guide socket, a vacuum tank, conduit means connecting the fluid pressure motor to the vacuum tank, a valve for controlling said conduit means, and means for connecting said valve to the accelerator pedal of the automobile for actuation thereby.

JOSEPH F. SHENEMAN.